United States Patent
Müller et al.

(10) Patent No.: US 6,861,128 B1
(45) Date of Patent: Mar. 1, 2005

(54) LAYERED COMPOSITE BASED ON THERMOPLASTIC POLYMERS

(75) Inventors: Klaus Müller, Sulzbach (DE); Klaus Klemm, Oberelsbach (DE)

(73) Assignee: Basell Polyolefine GmbH

( * ) Notice: Subject to any disclaimer, the term of this patent is extended or adjusted under 35 U.S.C. 154(b) by 0 days.

(21) Appl. No.: 09/456,516

(22) Filed: Dec. 8, 1999

(30) Foreign Application Priority Data

Dec. 16, 1998 (DE) .......................... 198 58 173

(51) Int. Cl.$^7$ ................................. B32B 7/00
(52) U.S. Cl. .................... 428/215; 428/156; 428/211; 428/213; 428/423.1
(58) Field of Search ............... 428/156, 542.2, 428/542.6, 211, 213, 215, 423.1

(56) References Cited

U.S. PATENT DOCUMENTS

| | | | | |
|---|---|---|---|---|
| 4,262,051 A | * | 4/1981 | Welz et al. | 428/283 |
| 4,772,496 A | * | 9/1988 | Maeda et al. | 428/35 |
| 5,139,854 A | * | 8/1992 | Johnson | 428/215 |
| 5,312,848 A | * | 5/1994 | Klapper et al. | 521/172 |
| 5,342,666 A | * | 8/1994 | Ellison et al. | 428/46 |
| 5,486,391 A | * | 1/1996 | Tyner | 428/44 |
| 5,827,788 A | * | 10/1998 | Miyakoshi | 442/164 |
| 5,851,931 A | * | 12/1998 | DeRenzo et al. | 442/62 |
| 5,976,671 A | * | 11/1999 | Gleim | 428/172 |
| 6,019,923 A | * | 2/2000 | Pelzer | 264/132 |
| 6,451,417 B1 | * | 9/2002 | Sumi et al. | 428/297.4 |

FOREIGN PATENT DOCUMENTS

| | | |
|---|---|---|
| DE | 1 629 691 | 1/1971 |
| DE | 1 629 641 | 2/1971 |
| DE | 197 22 339 | 12/1998 |
| FR | 2 673 575 | 9/1992 |

* cited by examiner

*Primary Examiner*—Elena Tsoy
(74) *Attorney, Agent, or Firm*—Keil & Weinkauf

(57) ABSTRACT

A layered composite has at least one decorative surface and comprises a backing layer made from a thermoplastic polymer which is not polypropylene, a decorative layer arranged thereupon and a heat-cured layer applied to the decorative layer. An intermediate layer may also be inserted as bonding material between the backing layer and the decorative layer. The decorative layer and the heat-cured layer may also be applied to both sides of the backing layer.

9 Claims, No Drawings

LAYERED COMPOSITE BASED ON THERMOPLASTIC POLYMERS

BACKGROUND OF THE INVENTION

The invention relates to a layered composite with at least one decorative surface and comprising a backing layer made from a thermoplastic polymer which is not polypropylene, a decorative layer arranged thereupon and a heat-cured layer applied to the decorative layer. The present invention also relates to a process for producing this layered composite.

Layered composites of this generic type are known and essentially consist of a core material of wood or at least of wood-like material, such as wood-fiber material or separate layers of paper compressed with addition of resin, onto which decorative materials, such as woodgrains or marble effects combined with crosslinkable resin materials (overlays) are applied with exposure to heat and pressure. Materials of this type are described, for example, in the Euwid company brochure.

However, the known materials have the disadvantage of a certain sensitivity to moisture penetrating from the edges into the core layer, because the wood or wood-like material tends to swell when exposed to moisture. The compression of the composites is, moreover, an expensive process in relation both to the energy which it requires and to costs, since the compression has to be carried out at from 140 to 180° C. and at pressures of up to 200 N/cm$^2$, and there is then also a post-press treatment lasting several days in order to prevent deformation of the sheets and form an ideally sealed surface.

For numerous industrial applications, for example in the automotive or electrical industry, there is a need for surface materials which on the one hand have high scratch resistance and on the other hand have relatively high heat resistance and which moreover can readily be provided with a decoration.

Surfacing material used for some time in furniture manufacturing has a number of layers, inter alia a backing layer, a decorative layer and a heat-cured layer lying thereupon, which with the aid of other bonding layers, for example made from paper or from adhesive films, produce a decorative layered composite. A layered composite of this type is, however, very complicated to produce, and often has a high formaldehyde content and exhibits undesirable swelling behavior.

The earlier Application DE-A 1 97 22 339 discloses a layered composite which comprises a backing layer made from polypropylene, a decorative layer arranged thereupon and a heat-cured layer applied to the decorative layer. However, for some applications there is a need for a layered composite which, instead of a backing layer made from polypropylene, has a backing layer made from another thermoplastic polymer, and therefore possesses somewhat different mechanical properties.

SUMMARY OF THE INVENTION

It is an object of the present invention to provide a layered composite which is made from a thermoplastic polymer and has at least one decorative surface and is resistant to moisture and to other similar environmental effects, such as chemicals, or glowing cigarettes, and which has improved abrasion resistance and high compressive strength, and is simple and cost-effective to produce.

We have found that this object is achieved by means of a layered composite with at least one decorative surface and comprising a backing layer made from a thermoplastic polymer which is not polypropylene, a decorative layer arranged thereupon and a heat-cured layer arranged on the decorative layer.

DESCRIPTION OF THE INVENTION

In the novel layered composite there may be a decorative layer, and a heat-cured layer applied to the decorative layer, on each side of the backing layer made from the thermoplastic polymer which is not polypropylene, resulting in a sandwich-type structure with the backing layer in the middle.

The backing-layer material comprises from 0 to 60% by weight, preferably from 0 to 50% by weight, particularly preferably from 0 to 40% by weight, based on the total weight of the mixture, of reinforcing fillers, such as barium sulfate, magnesium hydroxide, talc with an average particle size of from 0.1 to 10 µm, measured in accordance with DIN 66 115, wood, flax, chalk, glass fibers, coated glass fibers, long or short glass fibers, glass beads or mixtures of these. In addition, the backing-layer material may also comprise the usual additives, such as light stabilizers, UV stabilizers, heat stabilizers, pigments, carbon blacks, lubricants, flame retardants, blowing agents and the like, in the amounts which are usual and required.

Possible thermoplastic polymers other than polypropylene forming the backing layer are, inter alia, polyethylene, polyvinyl chloride, polyesters, polycarbonate, polyacrylates and polymethacrylates, polyamides, polyurethanes, polyacetals, such as polyoxymethylene, polybutylene terephthalates and polystyrenes. The backing layer preferably comprises, besides the reinforcing fillers, polyoxymethylene, polybutylene terephthalate or polystyrene, in particular copolymers of styrene with subordinate proportions of one or more comonomers, such as butadiene, α-methylstyrene, acrylonitrile, vinylcarbazole, or also esters of acrylic, methacrylic or itaconic acid. The backing layer of the novel layered composite may also comprise recycled material made from these thermoplastic polymers.

For the purposes of the present invention, the term polyoxymethylene includes homo- and copolymers of aldehydes, for example of formaldehyde, and of cyclic acetals, which contain recurring carbon-oxygen bonds in the molecule and have a melt flow rate of from 5 to 40 g/10 min, in particular from 5 to 30 g/10 min in accordance with ISO 1133 at 230° C. and under a load of 2.16 kg.

The polybutylene terephthalate preferably used is a relatively high-molecular-weight esterification product of terephthalic acid and butylene glycol and has a melt flow rate of from 5 to 45 g/10 min, in particular from 5 to 30 g/10 min in accordance with ISO 1133, at 230° C. and under a load of 2.16 kg.

Possible styrene copolymers are in particular copolymers with up to 45% by weight, preferably up to 20% by weight, of copolymerized acrylonitrile. Copolymers of this type made from styrene and acrylonitrile (SAN) have a melt flow rate of from 1 to 25 g/10 min, in particular from 4 to 20 g/10 min in accordance with ISO 1133 at 230° C. and under a load of 2.16 kg.

Other styrene copolymers preferably used comprise up to 35% by weight, in particular up to 20% by weight, of copolymerized acrylonitrile, and up to 35% by weight, in particular up to 30% by weight, of copolymerized butadiene. The melt flow rate of copolymers of this type made from styrene, acrylonitrile and butadiene (ABS) is from 1 to 40 g/10 min, in particular from 2 to 30 g/10 min in accordance with ISO 1133, at 230° C. and under a load of 2.16 kg.

The backing layer in the novel layered composite may also be a blend, i.e. a mixture of different thermoplastic polymers, for example a blend made from a copolymer of styrene with acrylonitrile and a copolymer made from butadiene and acrylonitrile.

To achieve very good bonding between the backing layer and decorative layer it can also be useful to insert an intermediate layer as bonding material between the backing layer and the decorative layer. Intermediate layers which can be used are, inter alia, impregnated paper, a nonwoven or an adhesion promotor, a primer or else an adhesive. The intermediate layer is preferably an impregnated paper or a nonwoven.

The decorative layer may be composed of a polymeric material which has an embossment or a coloration or a combination of both, for example in the form of a ready-to-use laminate. However, the decorative layer may also be composed of paper or of a fabric or of a paper-like or fabric-like or wood-like or metal-like material. Examples of these would be decorative layers made from an aluminum-like material or from a stainless-steel-like material, or else from a wood-, cork- or linoleum-like material.

The heat-cured layer (overlay) arranged on the decorative layer is composed of a thermosetting polymeric material, for example of a paper impregnated with melamine resin or with urea resin and crosslinked by exposure to pressure or heat during the production of the layered composite. Materials of this type are known per se and, inter alia, obtainable in the form of ready-to-use laminates from Melaplast in Schweinfurt, Germany.

In accordance with the invention the layer combination of decorative layer plus overlay (impregnation material) may if desired be arranged unilaterally or bilaterally on the backing layer, or on the intermediate layer. It is also possible to apply to the backing layer or to the intermediate layer a ready-to-use laminate which is composed of the decorative layer and overlay.

The total thickness of the novel layered composite is from 1 to 20 mm, preferably from 5 to 10 mm, and the backing layer makes up at least 80%, preferably at least 90%, of the total thickness.

To produce the novel layered composite, the backing-layer material is used to in-mold coat the materials for the decorative layer and the overlay, and also for any intermediate layer, both of which are in the form of thin flexible films or impregnated materials or else ready-to-use laminates. For this, the reinforced thermoplastic polymer is heated in an extruder to at least 180° C., preferably at least 200° C., and then, under a pressure of at least 80 N/cm$^2$, preferably at least 90 N/cm$^2$, is introduced into the injection-molding chamber of an injection-molding machine into which the films for the decorative layer and heat-cured layer, and also for any intermediate layer used, or the ready-to-use laminate, have previously been placed. A holding pressure of at least 10 N/cm$^2$, preferably at least 50 N/cm$^2$, is maintained while the tool is then cooled to a temperature not below 60° C., preferably not below 70° C., within a period of not more than 4 min, preferably not more than 3 min, and the mold is then removed from the injection-molding compartment.

Surprisingly, it has been found that the layered composite has excellent adhesion between each of the layers if the abovementioned process conditions are maintained during production of the novel layered composite. To further improve the adhesion between the layers it can be advantageous for the overlay to be subjected to a, preferably bilateral, flame treatment at from 50 to 80° C. before being placed into the injection-molding chamber.

The novel layered composite has surprisingly good suitability for producing any molding in which a decorative surface is to be combined with particular resistance to chemical, mechanical or thermal damage. The preferred use of the novel layered composite is for floorcoverings and wall panels. For these applications individual sheet-like moldings, for example, are produced from the novel layered composite and combined by laying together to give a floorcovering or wallcovering. To make this laying procedure easier in the preferred application for the person skilled in the art, the moldings of the novel layered composite are advantageously equipped laterally with interlocking elements of tongue-and-groove type. Sheet-like moldings produced from the novel layered composites can have projections on one end and on one side, and on the end and side which are opposite to the projections have recesses which are the geometric mirror image of the projections. This gives a simple way of joining the sheet-like moldings together reliably and with exact matching. The novel layered composites are also suitable as surface materials for automotive construction and for the electrical industry.

The following examples are intended to describe the invention in still greater detail. The working examples use the following measurement methods:

resistance to steam was determined in accordance with EN 438-2.24;

abrasion resistance was determined in accordance with EN 438-2.6 at from 6000 to 10 000 rpm;

compressive strength was determined by the falling-ball test in accordance with EN 438 with 8 mm backing plate, size of impression: 5.5 mm;

resistance to glowing cigarettes was determined in accordance with EN 438-2.18;

chemicals resistance was determined in accordance with DIN 51958;

scratch resistance was determined in accordance with ISO 1518;

bond strength was determined by using a razor blade to make cruciform parallel cuts (cross-cuts) in the surface of a molding. An adhesive tape was then pressed onto the cut surface and vigorously pulled off from the surface at an angle perpendicular to the same. If virtually no segments could be removed from the surface with the adhesive tape, the bond strength was graded "+"; if individual segments amounting to up to 10% of the total coverage could be pulled away, the result was graded "±"; and if more than 10% of the entire surface could be pulled away the result was graded "−". Particularly good bond strengths were graded "++".

EXAMPLE 1

A talc-reinforced styrene copolymer with 15% by weight of copolymerized acrylonitrile and a talc content of 30% by weight, based on the total weight of the molding composition, was heated to 280° C. and injected, at injection pressure of 110 N/cm$^2$, into a shallow injection-molding compartment into which had previously been placed, on the ejector side, a ready-to-use laminate made from overlay and decorative film from Melaplast. A holding pressure of 50 N/cm$^2$ was maintained while the mold was cooled to 80° C. within a period of 2 min. The injection-molding compartment was then opened and the resultant molding was removed. The results of tests on the unilaterally in-mold-coated molding are given in Table 1.

EXAMPLE 2

A long-glass-fiber-reinforced styrene copolymer with 15% by weight of copolymerized acrylonitrile and a long-glass-fiber content of 30% by weight, based on the total weight of the molding composition, was heated to 290° C. and injected, at an injection pressure of 110 N/cm², into a shallow injection-molding compartment into which had previously been placed, on the ejector side, the ready-to-use laminate used in Example 1. A holding pressure of 50 N/cm² was maintained while the mold was cooled to 80° C. within a period of 2 min. The injection-molding compartment was then opened and the resultant unilaterally in-mold coated holding was removed. The results of tests on the molding are given in Table 1.

EXAMPLE 3

A glass-bead- and long-glass-fiber-reinforced styrene copolymer with 15% by weight of copolymerized acrylonitrile and a glass-bead content of 10% by weight and a long-glass-fiber content of 20% by weight, based on the total weight of the molding composition, was heated to 290° C. and injected, at an injection pressure of 110 N/cm², into a shallow injection-molding compartment into which had previously been placed, on the ejector side, the ready-to-use laminate used in Example 1. A holding pressure of 50 N/cm² was maintained while the mold was cooled to 80° C. within a period of 2 min. The injection-molding compartment as then opened and the resultant unilaterally in-mold-coated molding was removed. The results of tests on the molding are given in Table 1.

EXAMPLE 4

An unreinforced styrene copolymer with 15% by weight of copolymerized acrylonitrile, was heated to 270° C. and injected, at an injection pressure of 100 N/cm², into a shallow injection-molding compartment into which had previously been placed, on the ejector side, the ready-to-use laminate used in Example 1. A holding pressure of 50 N/cm² was maintained while the mold was cooled to 80° C. within a period of 2 min. The injection-molding compartment was then opened and the resultant unilaterally in-mold coated molding was removed. The results of tests on the molding are given in Table 1.

COMPARATIVE EXAMPLE A

Example 1 was repeated except that instead of a reinforced styrene copolymer with copolymerized acrylonitrile as backing layer the backing layer used was now made from wood fibers. The results of the tests carried out are given in Table 1.

EXAMPLE 5

A long-glass-fiber-reinforced styrene copolymer with 15% by weight of copolymerized acrylonitrile and 10% by weight of copolymerized butadiene (ABS) and a long-glass-fiber content of 30% by weight, based on the total weight of the molding composition, was heated to 290° C. and injected, at an injection pressure of 110 N/cm², into a shallow injection-molding compartment into which had previously been placed, on the ejector side, the ready-to-use laminate used in Example 1. A holding pressure of 60 N/cm² was maintained while the mold was cooled to 85° C. within a period of 2 min. The injection-molding compartment was then opened and the resultant unilaterally in-mold-coated molding was removed. The results of tests on the molding are given in Table 2.

EXAMPLE 6

An unreinforced styrene copolymer with 15% by weight of copolymerized acrylonitrile and 10% by weight of copolymerized butadiene (ABS) was heated to 270° C. and injected, at an injection pressure of 100 N/cm², into a shallow injection-molding compartment into which had previously been placed, on the ejector side, the ready-to-use laminate used in Example 1. A holding pressure of 60 N/cm² was maintained while the mold was cooled to 70° C. within a period of 2 min. The injection-molding compartment was then opened and the resultant unilaterally in-mold-coated molding was removed. The results of tests on the molding are given in Table 2.

COMPARATIVE EXAMPLE B

Example 5 was repeated except that instead of a reinforced styrene copolymer with copolymerized acrylonitrile and butadiene (ABS) as backing layer the backing layer used was now made from wood fibers. The results of the tests carried out are given in Table 2.

EXAMPLE 7

A long-fiber-reinforced polybutylene terephthalate with a long-glass-fiber content of 30% by weight, based on the total weight of the molding composition, was heated to 300° C. and injected, at an injection pressure of 100 N/cm², into a shallow injection-molding compartment into which had previously been placed, on the ejector side, the ready-to-use laminate used in Example 1. A holding pressure of 50 N/cm² was maintained while the mold was cooled to 100° C. within a period of 1.0 min. The injection-molding compartment was then opened and the resultant unilaterally in-mold-coated molding was removed. The results of tests on the molding are given in Table 3.

EXAMPLE 8

An unreinforced polybutylene terephthalate was heated to 300° C. and injected, at an injection pressure of 100 N/cm², into a shallow injection-molding compartment into which had previously been placed, on the ejector side, the ready-to-use laminate used in Example 1. A holding pressure of 50 N/cm² was maintained while the mold was cooled to 90° C. within a period of 1.0 min. The injection-molding compartment was then opened and the resultant unilaterally in-mold-coated molding was removed. The results of tests on the molding are given in Table 3.

COMPARATIVE EXAMPLE C

Example 7 was repeated except that instead of a reinforced polybutylene terephthalate as backing layer the backing layer used was now made from wood fibers. The results of the tests carried out are given in Table 3.

EXAMPLE 9

A long-fiber-reinforced polyoxymethylene with a long-glass-fiber content of 30% by weight, based on the total weight of the molding composition, was heated to 200° C. and injected, at an injection pressure of 100 W/cm², into a shallow injection-molding compartment into which had previously been placed, on the ejector side, the ready-to-use laminate used in Example 1. A holding pressure of 50 N/cm² was maintained while the mold was cooled to 80° C. within a period of 1.0 min. The injection-molding compartment was then opened and the resultant unilaterally in-mold-coated molding was removed. The results of tests on the molding are given in Table 4.

EXAMPLE 10

An unreinforced polyoxymethylene was heated to 200° C. and injected, at an injection pressure of 100 N/cm², into a shallow injection-molding compartment into which had previously been placed, on the ejector side, the ready-to-use laminate used in Example 1. A holding pressure of 50 N/cm² was maintained while the mold was cooled to 70° C. within a period of 1.0 min. The injection-molding compartment was then opened and the resultant unilaterally in-mold-coated molding was removed. The results of tests on the molding are given in Table 4.

COMPARATIVE EXAMPLE D

Example 9 was repeated except that instead of a reinforced polyoxymethylene as backing layer the backing layer used was now made from wood fibers. The results of the tests carried out are given in Table 4 below.

Table 1

| | SAN | | | | |
|---|---|---|---|---|---|
| | Examples | | | | Comparative Example |
| | 1 | 2 | 3 | 4 | A |
| Performance in steam | nc | nc | nc | nc | Delamination, swelling |
| Abrasion resistance rpm | 8000 | 8000 | 8000 | 8000 | 8000 |
| Compressive strength | <6 mm | <5 mm | <4.5 mm | <7 mm | <8 mm |
| Cigarette resistance | nc | nc | nc | nc | nc |
| Chemicals resistance | resistant | resistant | resistant | resistant | some separation |
| Scratch resistance | >25N | >30N | >32N | >25N | >28N |
| Bond strength | + | ++ | ++ | + | + |
| Temperature change from −40° C. to +120° C. | nc | nc | nc | nc | Delamination, swelling | nc: no change

TABLE 2

| | ABS | | |
|---|---|---|---|
| | Examples | | Comparative Example |
| | 5 | 6 | B |
| Performance in steam | nc | nc | Delamination, swelling |
| Abrasion resistance rpm | 8000 | 8000 | 8000 |
| Compressive strength | <6 mm | <6.5 mm | <8 mm |
| Cigarette resistance | nc | nc | nc |
| Chemicals resistance | resistant | resistant | some separation |
| Scratch resistance | >30N | >25N | >30N |
| Bond strength | ++ | + | + |
| Temperature change from −40° C. to +120° C. | nc | nc | Delamination, swelling | nc: no change

TABLE 3

| | Polybutylene terephthalate | | |
|---|---|---|---|
| | Examples | | Comparative Example |
| | 7 | 8 | C |
| Performance in steam | nc | nc | Delamination, swelling |
| Abrasion resistance rpm | 8000 | 8000 | 8000 |
| Compressive strength | <5.5 mm | <6.5 mm | <8 mm |
| Cigarette resistance | nc | nc | nc |
| Chemicals resistance | resistant | resistant | some separation |
| Scratch resistance | >30N | >28N | >30N |
| Bond strength | ++ | + | + |
| Temperature change from −40°C. to +120° C. | nc | nc | Delamination, swelling | nc: no change

TABLE 4

| | Polyoxymethylene | | |
|---|---|---|---|
| | Examples | | Comparative Example |
| | 9 | 10 | D |
| Performance in steam | nc | nc | Delamination, swelling |
| Abrasion resistance rpm | 8000 | 8000 | 8000 |
| Compressive strength | <5.5 mm | <6.5 mm | <8 mm |
| Cigarette resistance | nc | nc | nc |
| Chemicals resistance | resistant | resistant | some separation |
| Scratch resistance | >30N | >29N | >30N |
| Bond strength | ++ | + | + |
| Temperature change from −40° C. to +120° C. | nc | nc | Delamination, swelling | nc: no change

It is apparent from Tables 1 to 4 that, compared with the layered composites of Comparative Examples A to D which have wood fibers as a backing layer, the novel layered composites, all of which comprise a thermoplastic polymer as backing layer (Examples 1 to 10) have greater resistance to steam and glowing cigarettes and also greater heat and chemicals resistance. In addition, the novel layered composites have better mechanical stability, in particular greater abrasion resistance, compressive strength, scratch resistance and bond strength, than the layered composites of Comparative Examples A to D.

We claim:

1. A layered composite useful for flooring coverings and wall panels with at least one decorative surface and consisting of a backing layer of a reinforced thermoplastic polymer which is not polypropylene, a decorative layer arranged thereupon and a heat-cured layer applied to the decorative layer, wherein a decorative layer and a heat-cured layer applied to the decorative layer are present on each side of the backing layer;

wherein the heat-cured layer arranged on the decorative layer is composed of a thermosetting polymeric material crosslinked by exposure to pressure or heat during the production of the layered composite;

wherein the total thickness of the layered composite is from 1 to 20 mm and whose backing layer makes up at least 80% of the thickness;

wherein said reinforced thermoplastic polymer comprises polyethylene, polyvinyl chloride, polyesters, polycarbonates, polyacrylates, polymethacrylates, polyamide, polyurethane, a polyacetal and/or polystyrenes, and which layered composite is prepared by heating said reinforced thermoplastic polymer to at least 180° C. in an extruder;

then, under a pressure of at least 80 N/cm$^2$, introducing said heated reinforced thermoplastic polymer into an injection molding chamber of an injection molding machine into which the films for the decorative layer and the heat cured layers and an optional intermediate layer have previously been placed, applying to the layers in the injection-molding machine a holding pressure of at least 10 N/cm$^2$, while maintaining said pressure, cooling to a temperature not below 60° C. for a period of not more than 4 minutes, and then removing the layered composite from the injection-molding chamber.

2. A layered composite as claimed in claim 1, which further comprises an intermediate layer between the backing layer and the decorative layer, and wherein the intermediate layer is a layer of impregnated paper, a layer of a nonwoven, or a primer layer.

3. A layered composite as claimed in claim 1 and comprising a polystyrene backing layer.

4. A layered composite as claimed in claim 1 and comprising a polybutylene terephthalate backing layer.

5. A layered composite as claimed in claim 1 and comprising a polyoxymethylene backing layer.

6. A layered composite as claimed in claim 1, where the decorative layer comprises a material which has an embossment or coloration or combination of both, or paper or a fabric or a wood material.

7. A layered composite as claimed in claim 1, whose total thickness is from 1 to 20 mm and whose backing layer makes up at least 80% of the total thickness.

8. A layered composite as claimed in claim 1 wherein the reinforcing material of the reinforced thermoplastic polymer comprises barium sulfate, magnesium hydroxide, talc, wood, flax, chalk, glass fibers or glass beads.

9. A layered composite as claimed in claim 1 which has a thickness of at least 5 mm.

* * * * *